United States Patent
Peng et al.

(10) Patent No.: US 7,194,281 B2
(45) Date of Patent: Mar. 20, 2007

(54) METHOD AND APPARATUS FOR SYNCHRONIZATION CONTROL OF FORWARD LINK TRANSMITTING POWER DURING SOFT HANDOFF IN WIRELESS COMMUNICATION SYSTEMS

(75) Inventors: Weizhong Peng, Nanshan District (CN); Yue Wang, Nanshan District (CN); Ping Li, Nanshan District (CN); Jia Qiao, Nanshan District (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 10/286,972

(22) Filed: Nov. 4, 2002

(65) Prior Publication Data
US 2004/0203782 A1  Oct. 14, 2004

(51) Int. Cl.
*H04B 7/00* (2006.01)
*H04B 7/185* (2006.01)
*H04B 1/00* (2006.01)

(52) U.S. Cl. .................. 455/522; 455/69; 370/318

(58) Field of Classification Search ............. 455/522, 455/69, 422, 509, 70, 226.1, 432.1, 436, 455/426.1, 442, 67.1; 370/318, 332, 333, 370/331; 375/227, 296, 297, 267, 347, 206, 375/208
See application file for complete search history.

(56) References Cited

U.S. PATENT DOCUMENTS 6,154,659 A  11/2000  Jalali et al.
6,249,682 B1*  6/2001  Kubo et al. ............... 455/522
6,330,462 B1*  12/2001  Chen ......................... 455/572
6,351,651 B1*  2/2002  Hamabe et al. .......... 455/522
2002/0072384 A1*  6/2002  Chheda ..................... 455/522

FOREIGN PATENT DOCUMENTS

EP  1 047 207 A2  10/2000

* cited by examiner

*Primary Examiner*—Melody Mehrpour
(74) *Attorney, Agent, or Firm*—Rothwell, Figg, Ernst & Manbeck

(57) ABSTRACT

The present invention relates to a method and an apparatus for synchronization control of forward link transmitting power during soft handoff, comprising: collecting the current transmitting power TX(i) of the forward links and the current reception quality of the reverse links; selecting the best base station BTS(x), recording and storing TX(x) reported by BTS(x), marking the BTS(x) as the base station with strong reverse link and the others as base stations with weak reverse link; sending the reverse link flags, TX(x) and the number of base stations involved in soft handoff to all base stations; determining whether a base station is the base station with weak link according to the flag from the base station controller; calculating the deviation between the current transmitting power TX(i) and the TX(x) if the base station is with weak link; adjusting the power control parameters and repeating the above steps; the parameters of the reception quality in reverse links are sampled for every frame in the invention, which not only improves the real time performance of synchronization, but also achieves power synchronization of all base stations and improves the system operation efficiency.

35 Claims, 12 Drawing Sheets

METHOD AND APPARATUS FOR SYNCHRONIZATION CONTROL OF FORWARD LINK TRANSMITTING POWER DURING SOFT HANDOFF IN WIRELESS COMMUNICATION SYSTEMS

TECHNICAL FIELD

The present invention relates to a method and an apparatus for synchronization control in wireless communication systems, in particular, relates to a method and an apparatus for synchronization control of forward link transmitting power during soft handoff in CDMA systems.

BACKGROUND TECHNOLOGY

The practical applications of CDMA systems show that the system capacity is not only limited by the reverse link capacity but also by the forward link capacity, which raises higher requirements of forward link power control (FLPC). It is the object of FLPC to assign reasonable power to forward traffic channels, and to minimize the interference with other users in the same cell and with the users in adjacent cells on the condition of ensuring the communication quality. Namely, the forward channel transmitting power should be as lower as possible on the condition that minimal required signal-to-noise ratio for demodulation in mobile stations is met. The adjustment of forward power control not only eliminates the "distance" effect, but also reduces the forward transmitting power to a minimum, depresses the interference with other users and increases the forward link capacity with communication quality ensured.

In IS-95 systems, FLPC tends to make every traffic channel transmit the lowest power under the condition that the desired frame error rate (FER) demanded by a mobile station is obtained. The mobile station continuously measures the FER in forward traffic channels and reports the power measurement report message up to the base station at a certain interval or at the time when the FER reaches a given threshold. Based on the FER report, the base station increases or decreases the transmitting power in the forward traffic channel with appropriate means. Of course, the base station limits the dynamic range of transmitting power in every traffic channel to guarantee the power to be under a maximum for not generating stronger interference and to be above a minimum for ensuring communication quality.

For RC1, the base station adjusts the transmitting power in forward channel based on the power measurement report message (PMRM) from the mobile station. The threshold report mode is used in IS-95 systems. In essence, based on the power threshold report, the quality of the current frame is determined indirectly, and the increase or decrease of power is decided thereby.

For RC2, besides by using PMRM, the base station adjusts the forward channel transmitting power by the erasure indication bit (EIB) in every reverse traffic frame via the codes received from the mobile station (EIB indicates whether the mobile station has received the last forward traffic data frame correctly). Since the reception of EIB is performed in every frame, it is obvious that the control period for adjustment of forward channel power by EIB is at least 20 ms.

It is seen that forward power control in IS-95A systems is a type of slow control mode with the control rate not higher than 50 Hz.

In CDMA2000-1X systems, when a mobile station enters a fast Rayleigh fading area, especially in the case when a high speed data traffic channel (SCH) works concurrently in the forward channel, the previous slow FLPC will no longer meet the requirements. Compared to CDMA95A systems, forward power control in CDMA2000-1X systems, on the one hand, is compatible with the forward power control mode of CDMA95A systems for RC1 and RC2, and on the other hand, introduces fast forward link power control (FFLPC) into forward links for RC3~RC5 conditions. In IMT2000 standard, the fast closed-loop forward link power control mode at the adjustment speed of 800 Hz, 400 Hz and 200 Hz for RC3~RC5 conditions is introduced, in which the outer loop power control on the mobile station side and the inner loop power control by both the mobile station and base station can be described as follows. (1) Outer loop power control. The target FER is obtained at a period of 20 ms by estimating and adjusting the setpoint based on Eb/Nt of the specified forward traffic channels. The adjustment of the setpoint can help the base station to obtain the appropriate transmitting level in the forward traffic channels of inner loop power control. There are three forms of setpoint: initial setpoint, maximum setpoint and minimum setpoint, which are sent to the mobile station by the base station in the form of a message. (2) Inner loop power control. In very power control group (PCG), the instruction of increasing or decreasing forward power control bit sent to the base station in reverse power control sub-channels of the current PCG is determined by comparing the estimated Eb/Nt of the received signal in the forward traffic channel with the current setpoint for the outer power control. The highest adjustment speed of power control instructions can reach 800 Hz at most.

Power control during soft handoff will be discussed in detail as follows.

In CDMA95A systems, the mobile station reports the conditions in forward links up to the selector vocoder module (SVM) of the base station controller (BSC) through the base stations involved in soft handoff. The output results calculated with power control algorithm stored in the SVM are sent to all base stations involved in soft handoff at the same time, so that all base stations transmit the same forward transmitting power. There does not exist synchronization operation of forward link transmitting power during soft handoff in IS-95 systems due to this centralized power control.

But in CDMA2000-1X systems, FFLPC is introduced for RC3~RC5. Forward transmitting power of all base stations involved in soft handoff is independent of each other, i.e. they can be controlled by their own FFLPC. As shown in FIG. 1, if no special measure is taken during soft handoff, the system performance will degrade to a great extent during soft handoff.

Suppose that a mobile station is brought into soft handoff with 2 base stations involved and no special measure is taken for processing forward power, where the mobile station communicates with BS2 first and then is switched to BS1. It is assumed that both base stations transmit at a higher power level (e.g., approximately 5% of the total power of one base station). When the mobile station moves towards to BS1, the link between the mobile station and BS2 fades rapidly. At this time, the mobile station will most likely send instructions of decreasing transmitting power to BS1 if the link between the mobile station and BS1 is very strong. Due to the influence of distance, shadow and fading, the reverse link of BS2 is so weak that higher error rate occurs in the power control information received by BS2 in the reverse link. Therefore, the transmitting power by BS2 may be increased and maintained at about 9%~10% of the total power of the base station. In the meanwhile, the link between the mobile station and BS1 is getting better and better, and the transmitting power of BS1 will gradually be decreased to about 1%~2% of the total power of the base station. The above situation is possible when the power control bit error rate in BS2 reaches 50%. BS1 may correctly receive the instruction of decreasing power from the mobile station, but the power control bit error rate received by BS2 is relatively high due to the faded link between the mobile station and BS2, which results in a slower and more inaccurate power adjustment of BS2 than that of BS1. The pointless transmission of BS2 at higher power level not only results in the loss of system capacity, but also enlarges the multipath noise in the system. In the example mentioned above, the system capacity is decreased since transmission of BS2 is at a higher power level far beyond the need. About 30% of total power of the base station is assigned to the pilot channel, sync channel and paging channel, and the remaining 70% is assigned to traffic channels. If 10% of this 70% is used to maintain a link with poor quality, the system capacity is bound to decrease. Of course, BS2 may possibly increase the transmitting power by mistake and may possibly decrease the forward transmitting power by mistake since the reverse link between BS2 and the mobile station has greatly faded and the power control bit error rate received by BS2 is relatively high. This situation may lead the case that the transmitting power of BS2 is too low to maintain this link and the link will be dropped at last. Although the link between BS2 and the mobile station is of poor quality, the link may be usable when the FER rises again, for example, when the mobile station moves back to BS2. So it is required to maintain the link between the mobile station and BS2 at an appropriate transmitting power level.

The above discussions demonstrate that, if no special measure is taken after that forward links of RC3~RC5 in CDMA2000-1X systems are involved in soft handoff, relatively big deviations of forward transmitting power between links involved in soft handoff may occur. Therefore, the forward link corresponding to a reverse link with poor reception quality will transmit high power unreasonably, so that the forward capacity of the system decreases and the severe interference in communications among other users within the system occurs; or the forward link transmitting power corresponding to the reverse link of poor reception quality is too low to maintain the link, decreases the stability of handoff process and the success rate of handoff. All those happened are due to that the FFLPC of RC3~RC5 introduced in CDMA2000-1X systems is a type of distributed control (i.e. the individual control by each base station). Therefore, there are large deviations between reverse links of all base stations involved during soft handoff. That is to say, the signal-to-noise ratio (SNR) of base stations in the reverse pilot channels differs from each other, which results in different forward power control bit error rate located in the reverse pilot channels and finally results in greater deviations of transmitting power between forward links.

In fact, it is a usual case that one reverse link is strong and the remaining reverse links are week in practical working CDMA systems. The empirical data show that the possibility of the occurrence of the case is over 90%. Therefore, some special "Synchronization" measure must be taken to avoid the great degradation of system performance.

For the convenience of descriptions and understanding in the following contexts, the "synchronization" in the present invention is interpreted as follows. In CDMA2000-1X systems, when the mobile users in forward traffic channels with wireless setup RC3 and above are involved in soft handoff conditions, the forward transmitting power of base stations with poor reception quality in their reverse links (named as week reverse links) are forced to approach to the forward transmitting power of the base station with best reception quality in its reverse link (named as strong reverse link) after big deviations of transmitting power between all forward links appear. This process is called as "Synchronization"

A criterion is required for determining the reception quality of a reverse link. In fact, the frame error rate (FER) and Eb/Nt of a reverse link both indicate the reception quality of the reverse links of a base station to some extent. In principal, the higher the reverse link FER, the poorer the reception quality of the reverse link; the lower the reverse link FER, the better the reception quality of the reverse link; the lower the reverse link Eb/Nt, the poorer the reception quality of the reverse link; the higher the reverse link Eb/Nt, the better the reverse link reception quality of the reverse link.

Moreover, the reception quality of a reverse link represents directly the forward link power control bit error rate in the reverse pilot channel. Namely, the better the reception quality of a reverse link, the lower the power control bit error rate of the forward link; the poorer the reception quality of a reverse link, the higher the power control bit error rate of the forward link.

U.S. Pat. No. 6,154,659 and EP1047207A2 describe their own methods for balancing the forward link transmitting power during soft handoff respectively.

U.S. Pat. No. 6,154,659 describes a method for synchronizing the transmitting power of base stations (not limited to 2 base stations) during soft handoff by monitoring the reverse link FER via the BSC. The synchronization is implemented by adjusting the gains of base stations with poorer quality and the gains of base stations with higher quality. In the synchronization process, the BSC monitors the reverse link FER of base stations involved in soft handoff in a predefined detection period which is equal to 20 frames or a multiple of 20 frames. The reverse link FER reflects the FFLPC bit error rate of the base station to some extent. It is believed generally that the higher the reverse link FER, the higher the FFLPC bit error rate.

The process of synchronizing the transmitting power of base stations during soft handoff by monitoring the reverse link FER is described as follows.

It is assumed that all base stations involved in soft handoff are controlled by the same BSC. All base stations continually calculate their reverse link average FER in every detection period, and send their own average FER up to the BSC at the end of the period. The BSC compares these average FER to a predefined threshold, which can be either the average FER of the current reverse links with the best quality or an FER predefined as a parameter. Once the average FER of a base station exceeds the threshold, the BSC will adjust the transmitting power of the base station and set the transmitting power of the base station to be equal to the power of the base station with the lowest average FER in the last detection period. Thus, the power synchronization of the base stations involved in soft handoff during the handoff process is implemented, and the power of a base station is not decreased too much so that traffic links are dropped. In the meanwhile, the power of a base station will not be adjusted too high in synchronization due to incorrect reception of power control bit, which may result in very strong interference and a decreased system capacity. It is not preferable to keep very big differences of power between base stations with the best and worst links in order to guarantee that all base stations involved in soft handoff transmit the appropriate power and the traffic links connected to a mobile station are preserved till the mobile station withdraws from the soft handoff completely.

In the method of U.S. Pat. No. 6,154,659, the real time performance is poor in power synchronization of all base stations by the BSC because the minimum detection period of 20 frames (20*20 ms=400 ms) is used for detecting the reverse link FER. Furthermore, the estimation of the reverse link FER has to be based on the average estimate value in a period of certain time span. In general, the longer the period, the closer the estimated average FER is to the actual reverse link quality. But in view of the real time performance of synchronization, the period can not be too long. Moreover, a filter must be introduced for estimating FER (by using weightings to historical data) even with the minimum detection period of 20 frames (20*20 ms=400 ms). The calculation with such a filter function involved will not only consume the CPU resources (the buffers for historical and intermediate data, etc.), but also decrease the efficiency of the overall estimation algorithm. Compared to the synchronization methods of Patent EP1047207A2 and the present invention, the detection period of 20 frames results in poorer real time performance.

Patent EP1047207A2 describes a method for synchronizing the transmitting power of base stations involved in soft handoff (not limited to 2 base stations) by monitoring the reverse link Eb/Nt via the BSC. The synchronization is implemented by adjusting gains of base stations with poorer quality in reverse links and the gains of base stations with higher signal quality in reverse links.

The process for synchronizing transmitting power of base stations involved in soft handoff by monitoring the Eb/Nt in reverse links is described as follows.

All base stations involved in soft handoff demodulate continually the forward power control bits in the reverse links in every PCG period and adjust the transmitting power in forward traffic channels based on the power control bits, that is to say that FFLPC is performed. In the meanwhile, the average Eb/Nt is calculated in a detection period of 20 ms (1 frame=16PCG=20 ms); via a message, the base stations involved in soft handoff send the average Eb/Nt in the detection period and the current transmitting power in forward traffic channels to the BSC controlling the base stations; based on the comparison of average Eb/Nt in the detection period reported from base stations, the BSC determines which base station is the best in receiving forward power control bit data and defines it as BTS(x); by comparing the transmitting power of other base stations with that of BTS(x), the BSC put those base stations into the power synchronization queue if the deviations of transmitting power of the base stations exceed a predetermined threshold. The transmitting power of the base stations in the queue are then adjusted to be equal to that of BTS(x). The procedure will be performed repeatedly till the mobile station withdraws from soft handoff completely.

In this method, although the real time performance is improved in synchronizing all base stations by the BSC due to the minimum Eb/Nt detection period of 1 frame (1*20 ms=20 ms) in reverse links, but the calculations of Eb/Nt of reverse links are rather complicated. The system operation efficiency will still be affected because that many formulas (including difficult logarithmic operations) and tables have to be dealt with in the calculations, and the calculations are complex and time-consuming.

SUMMARY OF THE INVENTION

The purpose of the invention is to provide a method and an apparatus for synchronization control of forward link transmitting power during soft handoff, in which the disadvantages in the prior art can be overcome.

Another purpose of the invention is to provide a method and an apparatus of synchronization control of forward link transmitting power during soft handoff, which are able to avoid the complicated, heavy and ineffective calculations in evaluating the reverse link quality, and to improve the real time operation among all base stations involved in soft handoff as well.

According to one aspect of the invention, the method for synchronization control of forward link transmitting power consists of the following steps:

the base stations involved in soft handoff collect the current transmitting power TX(i) of forward links and reception quality of reverse links in every frame (20 ms);

the BSC selects the best base station BTS(x) based on the reception quality of reverse links, records and stores TX(x) reported by BTS(x), marks said BTS(x) as the base station with strong reverse link and marks the others as base stations with weak reverse links;

the BSC sends reverse link flags, TX(x) and the number of base stations involved in soft handoff to all base stations via forward traffic data frame;

each base station determines whether it is a base station with weak link based on the reverse link flag in the forward traffic data frame;

it is required to calculate the difference between the current transmitting power TX(i) and TX(x) if said base station is a base station with weak link, $|TX(i)-TX(x)|>$ Threshold ($i \neq x$) indicates said base station having a large deviation from the transmitting power of the base station with strong reverse link, and said base station will perform power synchronization to bring TX(i)=TX(x);

$|TX(i)-TX(x)| \leq$ Threshold ($i \neq x$) indicates said base station having a small deviation from the transmitting power of the base station with strong reverse link, and said base station will not perform power synchronization;

once the number of base stations involved in soft handoff changes, all power control parameters of a base station will be adjusted no matter said base station is with strong link or weak link;

the above steps are executed repeatedly.

In the method, the determination of strong or weak link can also be based on the following criteria:

a link is marked as a weak link if the FFLPC bit error rate of the link becomes higher as the reverse link FER becomes higher;

a link is marked as a strong link if the FFLPC bit error rate of the link becomes lower as the reverse link FER becomes lower.

Besides, the determination of strong or weak link can also be based on the following criteria:

a link is marked as a weak link if the FFLPC bit error rate of the link becomes higher as the reverse link Eb/Nt becomes lower;

a link is marked as a strong link if the FFLPC bit error rate of the link becomes lower as the reverse link Eb/Nt becomes higher.

Moreover, the determination of strong or weak link can also be based on the following criteria:

a link is marked as a weak link if the FFLPC bit error rate of the link becomes higher as the reverse pilot channel frame energy (ER-PICH) becomes lower;

a link is marked as a strong link if the FFLPC bit error rate of the link becomes lower as the reverse pilot channel frame energy (ER-PICH) becomes higher.

The adjustment of power control parameters in the status transition during soft handoff includes individual or simultaneous adjustment of the following one or more parameters:

when a mobile station is brought into soft handoff status from non soft handoff status or the number of base stations involved in soft handoff increases, the range between the upper and lower limits of the transmitting power of the forward traffic channels [MIN_PWR, MAX_PWR] will be narrowed, the adjustment step length, the ascending step length PWR_STEPSIZE_UP and the descending step length PWR_STEPSIZE_DOWN of forward power control will be decreased accordingly; Taking reverse power control into consideration, the BSC sends the handoff message to the mobile station to decrease the reverse link power control step (PWR_CNTL_STEP) accordingly; and inform the mobile station via corresponding handoff instruction message to increase the power control bit gain (PC_GAIN) accordingly;

when a mobile station withdraws from soft handoff status or the number of base stations involved in soft handoff decreases, the range between the upper and lower limits of the transmitting power of the forward traffic channels [MIN_PWR, MAX_PWR] will be widened, in the meanwhile, the ascending step length PWR_STEPSIZE_UP and descending step length PWR_STEPSIZE_DOWN of forward power control will be increased accordingly; if reverse link power control is incorporated, the BSC sends the handoff instruction message to the mobile station to increase the reverse link power control step length PWR_CNTL_STEP accordingly; and informs the mobile station via corresponding handoff instruction message to decrease the power control bit gain PC_GAIN accordingly According to another aspect of the invention, the method for synchronization control of forward link transmitting power consists of the following steps:

the base stations involved in soft handoff collect the current transmitting power TX(i) of the forward links and the current reception quality of the reverse links in every frame (20 ms), and send them up to the BSC via the reverse traffic data frame;

the BSC selects the best base station BTS(x) based on the reception quality of reverse links, records and stores TX(x) reported by BTS(x), marks said BTS(x) as the base station with strong reverse link and marks the others as base stations with weak reverse links, this step is completed in the SVM of the BSC;

the algorithmic function stored in the SVM of the BSC calculates the average value TX(x) average of the last N frames at the end of the Nth frame and assigns it to TX(x), and the other TX(x) within the period are set with 0x00;

the BSC transmitting the reverse link flags, TX(x) average (at the end of the period) or 0x00 (within the period), and the number of base stations involved in soft handoff to all base stations via the forward traffic data;

the base stations making the following decisions based on TX(x) in the forward traffic data frame from the BSC, TX(x)=0x00 means that the end of the period has not arrived and a decision of whether the operation of slipping window is needed is not made, i.e. the base station with strong reverse link will continue to carry out FFLPC and base stations with weak reverse links will maintain at the transmitting power level equal to the median value of the upper and lower limits of the current window for the base station with strong reverse link, TX(x)≠0x00 means that the end of a period has arrived and the decision of the whether the operation of slipping window is needed will be made;

determining whether the TX(x) average of the base station with strong reverse link is very close to the upper or lower limit of the current window, the window needs to be slipped if said TX(x) average is close to the limits and the window needs not to be slipped otherwise; the window should be moved up if said TX(x) average is close to the upper limit of the window and the window should be moved down if said TX(x) is close to the lower limit of the window;

the base stations performing the operation of slipping window for traffic channel transmitting power, said slipping window operation must be carried out by all base stations involved in soft handoff at the same time;

once the number of base stations involved in soft handoff changes, all power control parameters will be adjusted no matter the link is strong or weak;

execute the above steps repeatedly during soft handoff.

There are three methods for determining whether a link is strong or weak during soft handoff as follows:

a link is marked as a weak link if the FFLPC bit error rate of the link becomes higher as the reverse link FER becomes higher; a link is marked as a strong link if the FFLPC bit error rate of the link becomes lower as the reverse link FER becomes lower;

a link is marked as a weak link if the FFLPC bit error rate of the link becomes higher as the reverse link Eb/Nt becomes lower; a link is marked as a strong link if the FFLPC bit error rate of the link becomes lower as the reverse link FER becomes higher;

a link is marked as a weak link if the FFLPC bit error rate of the link becomes higher as the reverse pilot channel frame energy (ER-PICH) becomes lower; a link is marked as a strong link if the FFLPC bit error rate of the link becomes lower as the reverse pilot channel frame energy (ER-PICH) becomes higher.

The adjustment of power control parameters in the status transition during soft handoff includes individual or simultaneous adjustment of the following one or multiple parameters:

when a mobile station is brought into soft handoff status from non soft handoff status or the number of base stations involved in soft handoff increases, the range of upper and lower limits of the transmitting power in the forward traffic channels [MIN_PWR, MAX_PWR] will be narrowed, the adjustment step length, ascending step length PWR_STEPSIZE_UP and descending step length PWR_STEPSIZE_DOWN of forward power control will be decreased accordingly; Taking reverse link power control into consideration, the BSC sends the handoff instruction message to the mobile station to decrease the reverse link power control step length PWR_CNTL_STEP accordingly; and inform the mobile station to increase the power control bit gain PC_GAIN via the corresponding handoff instruction message accordingly;

when the mobile station withdraws from soft handoff status or the number of base stations involved in soft handoff decreases, the range of the upper and lower limits of the transmitting power in the forward traffic channel [MIN_PWR, MAX_PWR] will be widened, in the meantime, the ascending step length PWR_STEPSIZE_UP and the descending step length PWR_STEPSIZE_DOWN will be increased accordingly; if reverse link power control is incorporated, the BSC will send the handoff instruction message to the mobile station to increase the reverse link power control step length PWR_CNTL_STEP accordingly; and the BSC will inform the mobile station to decrease the power control bit gain PC_GAIN via the corresponding handoff instruction message accordingly.

In the above adjustment, narrowing the range of forward traffic channel transmitting power [MIN_PWR, MAX_PWR] can be carried out by increasing the lower limit MIN_PWR, or adjusting the upper and lower limits at the same time.

In the above adjustment, widening the range of forward traffic channel transmitting power [MIN_PWR, MAX_PWR] can be carried out by decreasing the lower limit MIN_PWR, or adjusting the upper and lower limits at the same time. The scale of adjustment in widening the range or decreasing the lower limit should be equal to the scale of narrowing the range or increasing the lower limit for the corresponding situations.

A method for synchronization control of forward link transmitting power in mobile communication systems during soft handoff, wherein said mobile communication system consists of base stations involved in soft handoff, mobile stations and a BSC, includes the following steps:

Step 1. The base stations involved in soft handoff collect the current transmitting power TX(i) of the forward links and the current reception quality of the reverse links in every frame (20 ms);

Step 2. The BSC selects the best base station BTS(x) based on the reception quality of reverse links, records and stores TX(x) reported by BTS(x), marks said base station as a base station with strong reverse link and marks the others as base stations with weak reverse links;

Step 3. The BSC transmits the reverse link flags, TX(x) and the number of base stations involved in soft handoff to all base stations via the forward traffic data frame;

Step 4. All base stations determine whether they are base stations with weak links based on the reverse link flags in the forward traffic data frame from the BSC;

the difference between the current transmitting power TX(i) and TX(x) is calculated for a base station with weak link, |TX(i)−TX(x)|>Threshold (i≠x) indicates said base station having a big deviation from the transmitting power of the base station with strong reverse link, the power synchronization should be performed to set TX(i)=TX(x);

|TX(i)−TX(x)|≦Threshold (i≠x) indicates said base station having a small deviation from the transmitting power of the base station with strong reverse link, the base station does not need to perform power synchronization;

Step 5. No matter the link is strong or weak, all power control parameters will be adjusted once the number of base stations involved in soft handoff changes;

Step 6. Execute Step 1 to Step 5 repeatedly.

A method for synchronization control of forward link transmitting power during soft handoff includes the following steps:

Step 1. All base stations involved in soft handoff collecting the current transmitting power TX(i) of the forward links and the current reception quality of the reverse links in every frame (20 ms), and send them up to the BSC via the reverse traffic data frame, this step is carried out on the base station side;

Step 2. The BSC selecting the best base station BTS(x) based on the reception quality of reverse links, records and stores TX(x) reported by BTS(x), marks said BTS(x) as the base station with strong reverse link and marks the others as base stations with weak reverse links, this step is completed in the SVM of the BSC;

Step 3. The corresponding algorithmic function stored in the SVM of the BSC calculating the average value TX(x) average of the last N frames at the end of the N frame period, and assign it to TX(x), the TX(x) of the other frames within the period are filled in with 0x00; TX(x)=E(TX(x)) when x=$i_N$; TX(x)=0 when x=0–N−1;

Step 4. The BSC transmitting the reverse link flags, TX(x) average (at the end of the period) or 0x00 (within the period), and the number of base stations involved in soft handoff to all base stations via the forward traffic data;

Step 5. The base stations making the following decisions based on the TX(x) in the forward traffic data frame from the BSC, TX(x)=0x00 means that the end of the period has not arrived and the decision of whether the operation of slipping window is needed will not be made, i.e. the base station with strong reverse link will continue to execute FFLPC and the base stations with weak reverse links will maintain the transmitting power at the median value of the upper and lower limits of the current window for the base station with strong reverse link, TX(x)≠0x00 means that the end of the period has arrived and the decision of slipping window operation should be made;

Step 6. Determining whether the TX(x) average of the base station with strong reverse link is very close to the upper or lower limit of the current window, the window needs to be slipped if said TX(x) average is close to the limits and the window needs not to be slipped otherwise, the window should be moved up if said TX(x) average is close to the upper limit of the window and the window should be moved down if said TX(x) is close to the lower limit of the window;

Step 7. The base stations performing the slipping window operation for traffic channel transmitting power, the operation of said window must be carried out by all base stations involved in soft handoff at the same time;

Step 8. No matter the link is strong or weak, all power control parameters being adjusted once the number of base stations involved in soft handoff changes;

Step 9. Executing Step 1 to Step 8 repeatedly in soft handoff status.

In the above method, the adjustable power control parameters include upper and lower limits of transmitting power in forward traffic channels, ascending and descending step lengths of forward power control, reverse power control step length and power control bit gain.

The procedures for adjusting the power control parameters are as follows: as the number of base stations involved in soft handoff increases, the range between the upper and lower limits of transmitting power in forward traffic channels is narrowed accordingly, the ascending and descending step lengths of forward power control and reverse power control step length are decreased accordingly, and the power control bit gain will be increased accordingly; as the number of base stations involved in soft handoff decreases, the range between the upper and lower limits of transmitting power in forward traffic channels are widened accordingly, the ascending and descending step lengths of forward power control and reverse power control step length are increased back accordingly, and the power control bit gain is decreased back accordingly.

The adjustment of the above parameters can be carried out simultaneously, or only one or few parameters are selected for adjustment, depending on the sensitivity of parameters to the system.

The procedure of slipping window operation in the synchronization method will be described as follows.

In the case that the upper and lower limits of transmitting power in forward traffic channels are adjusted when soft handoff status changes, the transmitting power of the base station with strong reverse link is allowed to vary within the maximum range for non soft handoff status; namely, the window of traffic channel transmitting power is allowed to be moved up or down, the base station with strong reverse link performs FFLPC and base stations with weak reverse links stop executing FFLPC, in the meanwhile, the adjustment speed of transmitting power in base stations with weak reverse links is decreased, so that the forward link transmitting power of base stations with weak reverse links is kept equal to the median value of the upper and lower limits of forward transmitting power for the base station with strong reverse link within a specified period (e.g. 400 ms or 1 s), and all base stations are permitted to adjust the window of transmitting power in forward traffic channels only at the end of the period.

The reason that the window for forward link transmitting power of the base station with strong reverse link is allowed to be moved can be explained as follows: the dominant base station during soft handoff is the base station with strong reverse link, therefore, slipping of the window can adapt base stations to different radio conditions to the full extent and guarantee that base stations involved in soft handoff work at a forward transmitting power level as low as possible.

In the synchronization control method proposed in the invention the quality parameters in reverse links are sampled in every frame (20 ms). The real time performance of synchronization is improved in this method compared to Patent U.S. Pat. No. 6,154,659 in which synchronization control of power of all base stations is implemented by monitoring the reverse link FER. Furthermore, a more relevant parameter, the frame energy of the reverse pilot channel, is obtained, the complicated calculations of reverse link signal-to-noise ratio Eb/Nt from the frame energy of reverse pilot channels are simplified and the operation efficiency of the system is improved in the invention compared to Patent EP1047207A2 in which synchronization control of power of all base stations is implemented by monitoring the reverse link Eb/Nt.

BRIEF DESCRIPTIONS OF THE DRAWINGS

DETAILED DESCRIPTIONS OF AN EMBODIMENT

Figure 1:
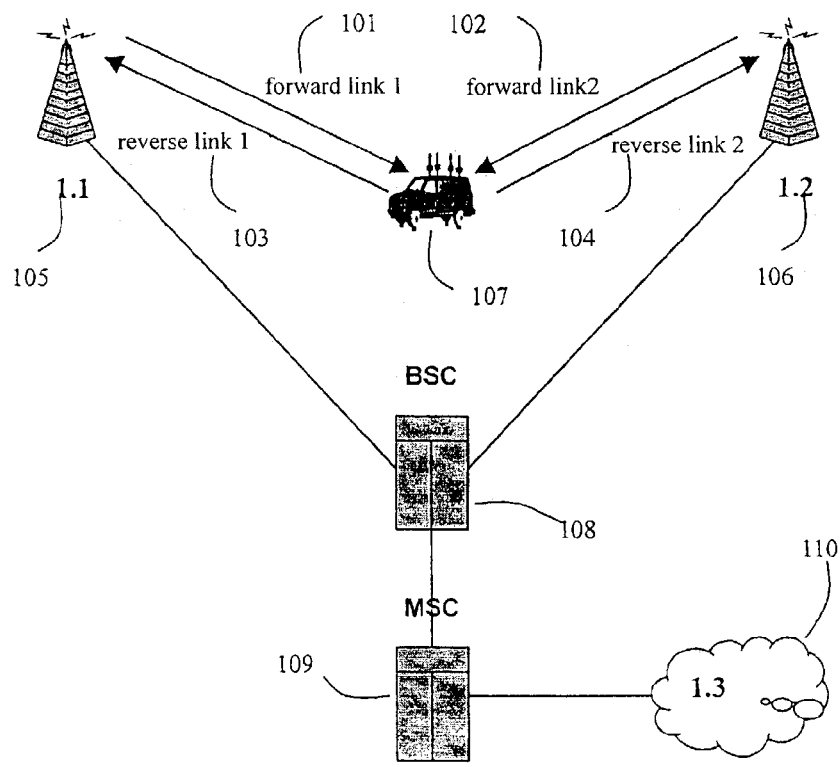
FIG. 1 is a simple schematic diagram illustrating the change of forward link power during soft handoff.

In FIG. 1, the BSC 108 is connected to the Public Switched Telephone Network (PSTN) 110, the base stations (BS) 105 and 106 are connected to the BSC 108. During a typical soft handoff with two base stations involved, the mobile station (MS) 109 communicates with BS1 and BS2 through forward/reverse links 101/103 and 102/104, respectively. The relationship of power control in forward and reverse links has been described as in Section "Background Technology". In CDMA2000-1x systems, FFLPC has been introduced for RC3~RC5. The forward link power of all base stations involved in soft handoff is independent of each other, i.e. they can be controlled by their own FFLPC. The system performance during soft handoff will degrade a great deal if no specific measure is taken in soft handoff. To this end, two methods are proposed in the invention as the specific measures.

Figure 2:
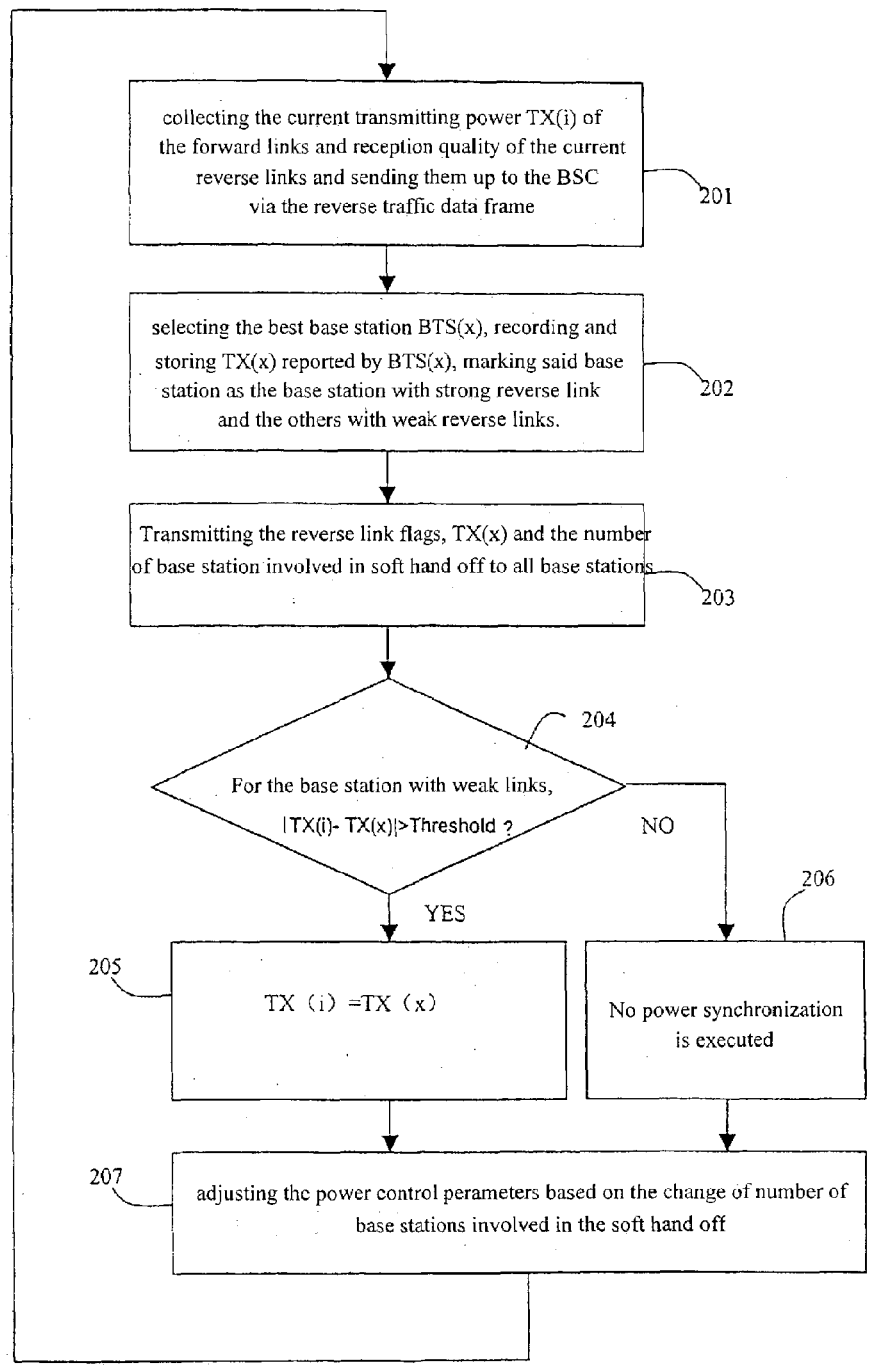
FIG. 2 is a flowchart for power synchronization control during soft handoff proposed in an embodiment of the invention.

FIG. 2 illustrates the flowchart of the first synchronization method (Method 0) proposed in the invention. In Step 201, all base stations involved in soft handoff collect the current transmitting power TX(i) of the forward links and the reception quality of the current reverse links in every frame (20 ms), and then send them up to the BSC via the reverse traffic data frame, this step is completed on the base station side in this embodiment. In Step 202, the BSC selects the best base station BTS(x) based on the reception quality of reverse links, records and stores TX(x) reported by BTS(x) and marks said base station as the base station with strong reverse link and the others as base stations with weak reverse links, this step is accomplished in the SVM of the BSC in the embodiment. In Step 203, the BSC transmits the reverse link flags, TX(x) and the number of base stations involved in soft handoff to all base stations via the forward traffic data frame, this step is accomplished in the SVM of the BSC in the embodiment. In Step 204 following Step 203, a decision is made according to the reverse link flags in the forward traffic data frame from the BSC. In this step, the deviation between TX(i) and TX(x) is not calculated for the base station with strong link, but the deviations have to be calculated for the base stations with weak links; |TX(i)−TX(x)|>Threshold (i≠x) indicates that there is a relatively large deviation from the forward transmitting power of the base station with strong reverse link, and power synchronization should be performed by the base station with weak link to set TX(i)= TX(x), i.e. the operation in Step 205 should be executed; |TX(i)−TX(x)|≦Threshold (i≠x) indicates that there is a small deviation from the forward Threshold (i≠x) indicates that there is a small deviation from the forward transmitting power of the base station with strong reverse link, and power synchronization will not be performed, i.e. Step 206 follows. No matter the link is strong or weak, all base stations will adjust the power control parameters based on the change of number of base stations involved in soft handoff in the forward traffic data frame from the BSC, refer to Step 207. Steps 204, 205, 206 and 207 are all implemented in base stations in this embodiment.

Figure 3A:
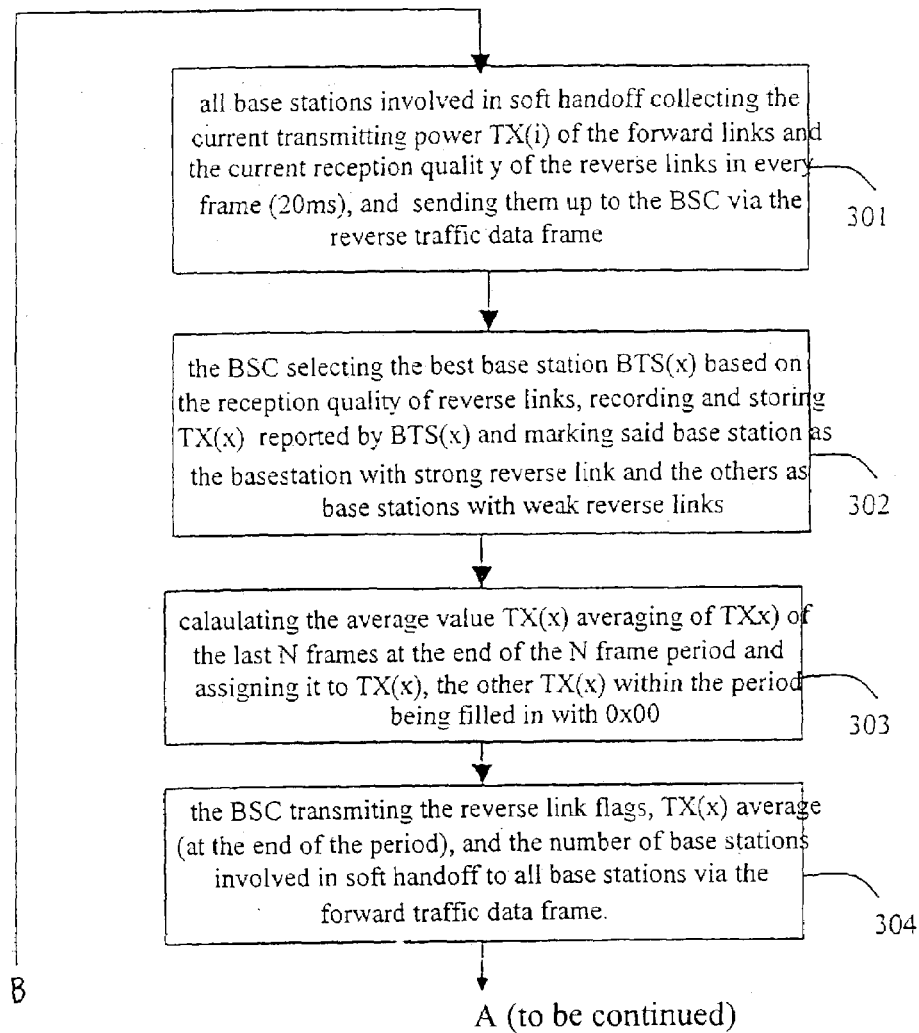
FIG. 3 is a flowchart for power synchronization control during soft handoff proposed in another embodiment of the invention.
Figure 3B:
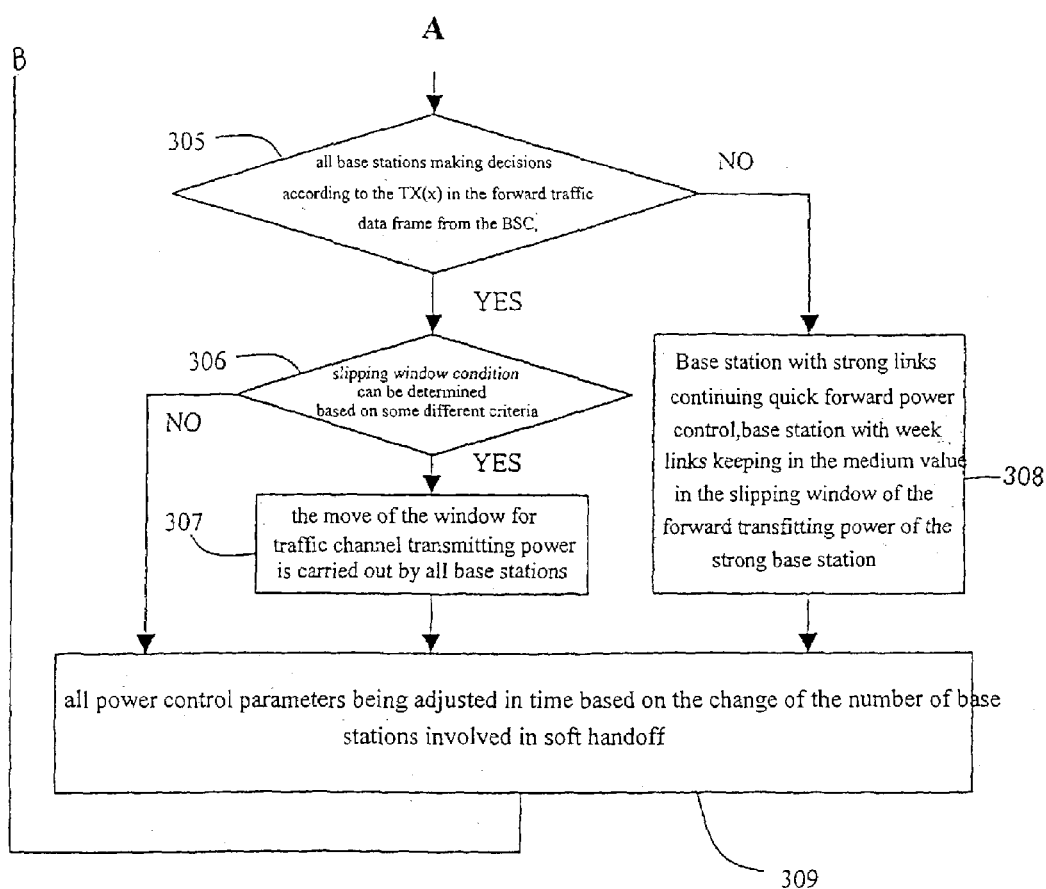

FIG. 3 illustrates the flowchart of Method 1 of the invention. In Step 301, all base stations involved in soft handoff collect the current transmitting power TX(i) of the forward links and the current reception quality of the reverse links in every frame (20 ms), and then send them up to the BSC via the reverse traffic data frame, this step is completed on the base station side in this embodiment. In Step 302, the BSC selects the best base station BTS(x) based on the reception quality of reverse links, records and stores TX(x) reported by BTS(x) and marks said base station as the base station with strong reverse link and the others as base stations with weak reverse links, this step is accomplished in the SVM of the BSC in the embodiment. In Step 303, the algorithmic function stored in the SVM of the BSC is used to calculate the average value TX(x) average of TX(x) of the last N frames at the end of the N frame period and assigns it to TX(x), the other TX(x) within the period are filled in with 0x00. In Step 304, the BSC transmits the reverse link flags, TX(x) average (at the end of the period) or 0x00 (within the period), and the number of base stations involved in soft handoff to all base stations via the forward traffic data frame. In Step 305, all base stations make decisions according to the TX(x) in the forward traffic data frame from the BSC, TX(i)=0x00 indicates that the end of the period has not arrived, the decision of slipping window operation will not be made, then the procedure goes to Step 308; TX(i)≠0x00 indicates that the end of the period has arrived, the decision of slipping window operation then is made, and the procedure goes to Step 306. In Step 306, the satisfaction of slipping window condition can be determined based on some different criteria, the decision is made according to that whether the current TX(x) average of the base station with stronger link is close to the upper or lower limit of the current window in the present method, the window should be moved if said TX(x) average is close to the limits and the move of the widow is not required otherwise, the window should be moved up if said TX(x) average is close to the upper limit and the window should be moved down if said TX(x) average is close to the lower limit. In Step 307, the move of the window for traffic channel transmitting power is carried out by all base stations, furthermore, the slipping window operation has to be carried out by all base station involved in soft handoff at the same time. In Step 309, all power control parameters are adjusted in time based on the changes of the number of base stations involved in soft handoff in the forward traffic data frame from the BSC by all base stations, no matter it is with strong or weak link.

Figure 4:
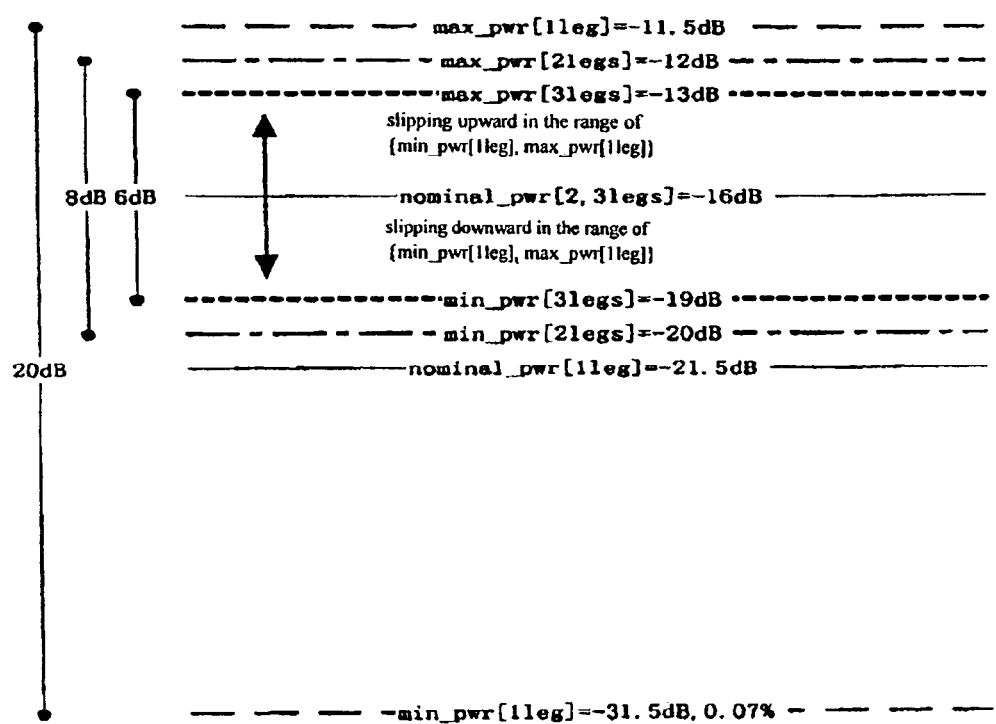
FIG. 4 is a schematic diagram of a slipping window with the upper and lower limits in a traffic channel.
Figure 5:
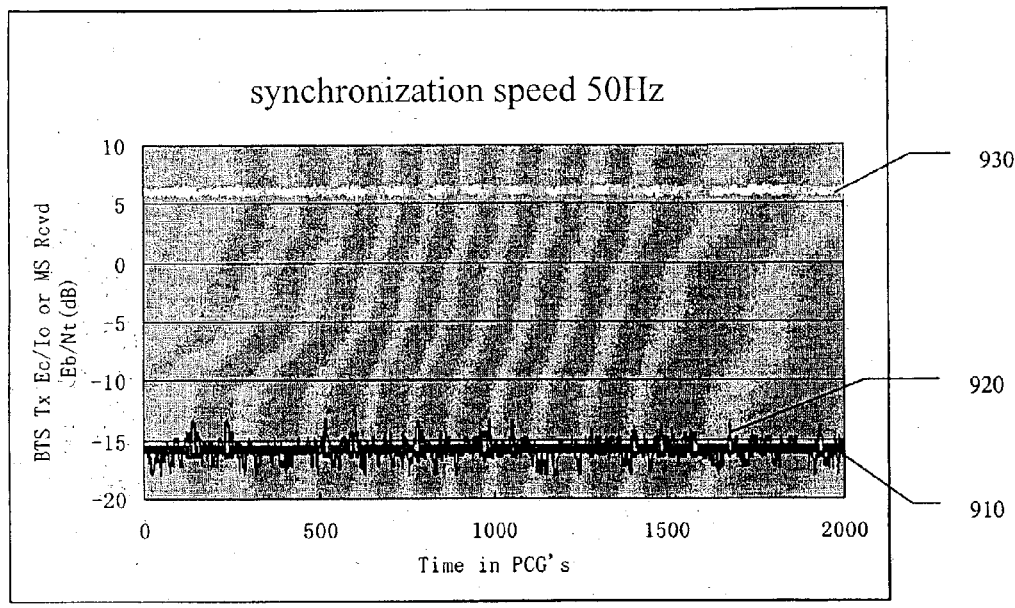
FIGS. 5–10 are the simulation results during soft handoff at the synchronization speeds of 50 Hz, 25 Hz, 10 Hz, 5 Hz, 2 Hz and 1 Hz, respectively.
Figure 6:
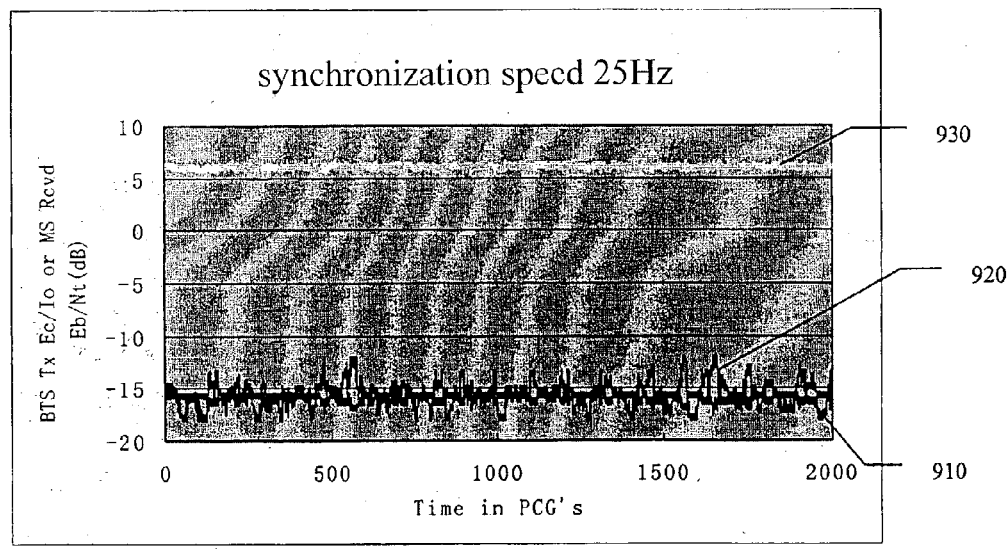
Figure 7:
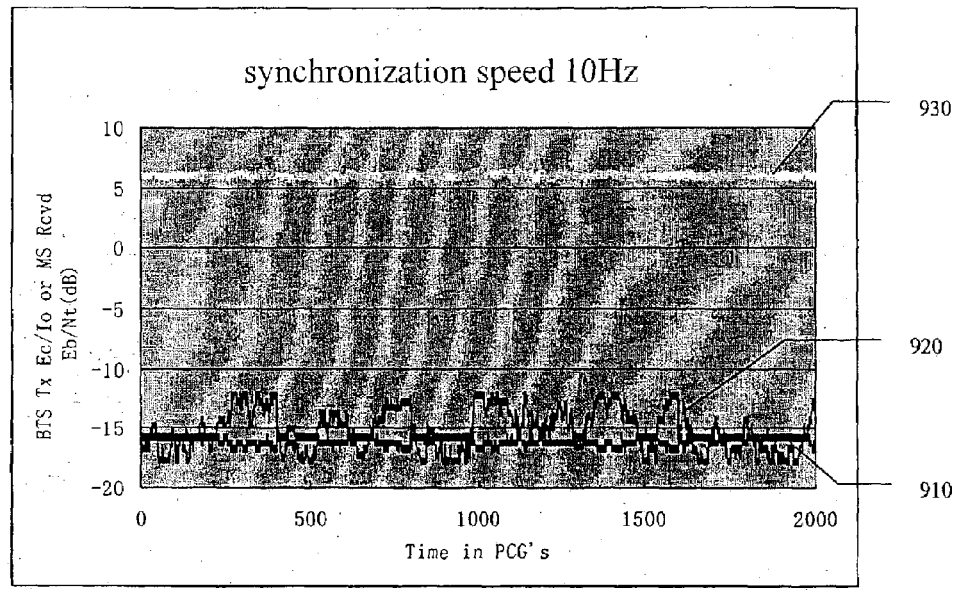
Figure 8:
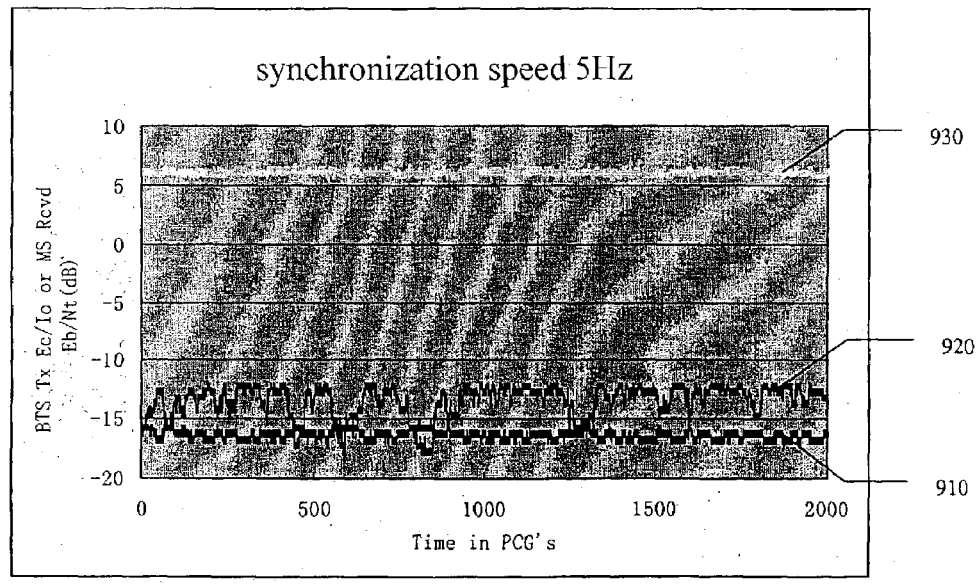
Figure 9:
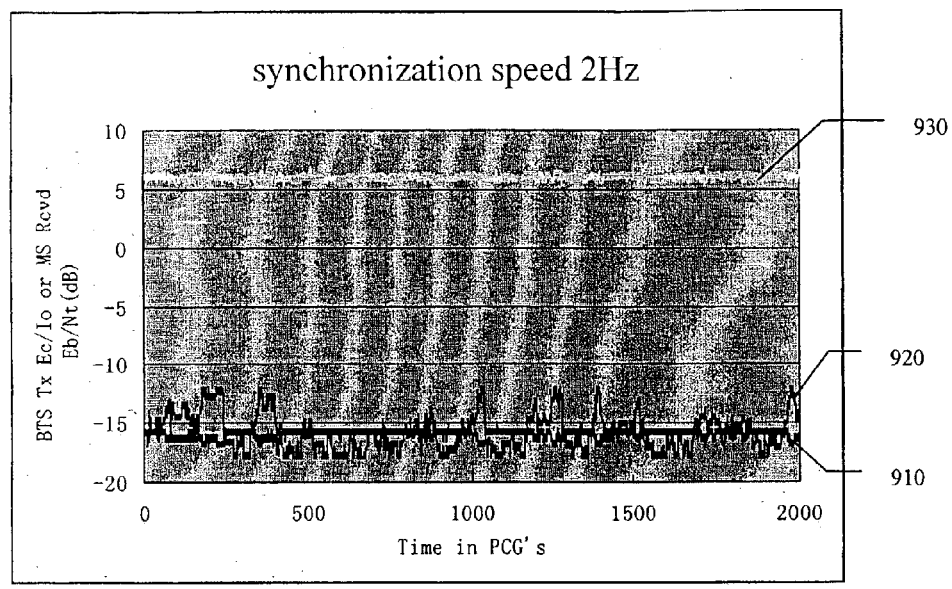
Figure 10:
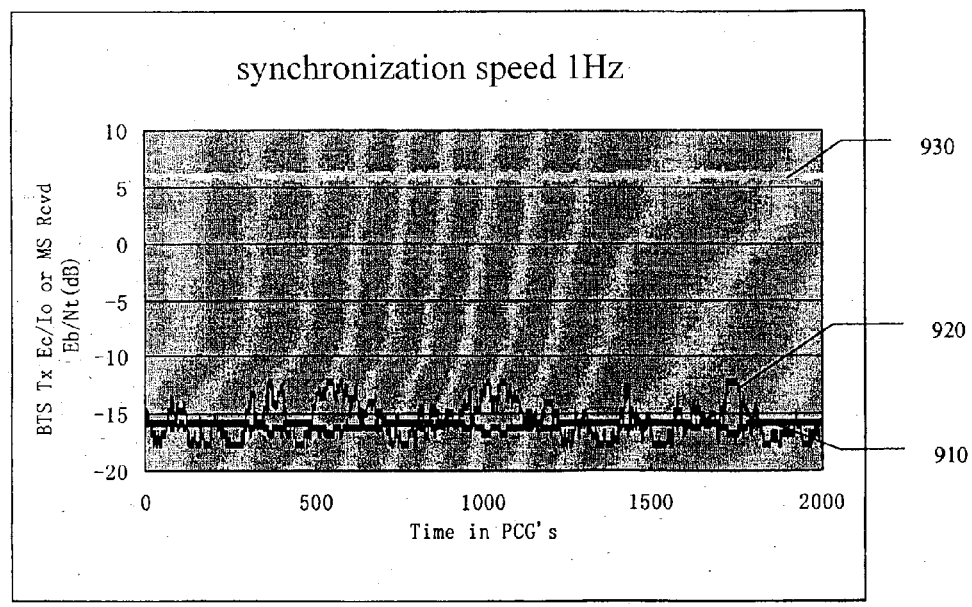

FIG. 4 describes briefly the basic idea of implementation of slipping window operation, i.e. adjustment of the range between the upper and lower limits of traffic channel transmitting power. It is seen from FIG. 4 that the range of the window for traffic channel transmitting power in non soft handoff status reaches its maximum value of 20 dB, and the range of the slipping window of traffic channel transmitting power is narrowed accordingly after soft handoff is brought into. In Method 0, the range of the slipping window of traffic channel transmitting power is moved to a fixed position when the status of soft handoff changes, and remains unchanged thereafter. But in Method 1, while said range is narrowed, the slipping window with the narrowed range as a whole can still be moved up or down within the maximum range (min_pwr[1leg], max_pwr[1leg]) for non soft handoff status. The essence of the method is that the base station with strong reverse link is dominant during soft handoff. Furthermore, the forward link transmitting power can be adjusted to be lower than the lower limit of the fixed window when the base station with strong link is in a very good radio environment. Consequently, slipping of the window of traffic channel transmitting power will meet various requirements of radio environments more flexibly, and will make all base stations involved in soft handoff transmit the lowest and the most appropriate power, and will finally improve the forward capacity of the system.

The main differences between Method 0 and Method 1 can be stated as follows:

(1) control of synchronization speed in Method 1 is related to the N frame period, the synchronization speed is 1 Hz if N=50 and 5 Hz if N=10, but the synchronization speed in Method 0 is determined according to the threshold and can reach the maximum of 50 Hz if the threshold is 0, synchronization speed used in Method 0 is, in general, about 10–20 Hz when a proper threshold is used;

(2) in the processing in the SVM of the BSC, the procedure in Method 1 is more complex than that in Method 0, since in Method 1, forward link transmitting power of the base station with the best quality in receiving forward link power control bit of the last N frames must be stored, and the average power of the forward transmitting power of the base station must be calculated at the end of the N frame period, but in Method 0, only the forward link transmitting power of the base station with the best quality in receiving forward link power control bit of the current frame is filled into the forward link traffic frame, which is then sent to all base stations involved in soft handoff;

(3) in Method 0, TX(x) in the forward link traffic frame is filled in with the average transmitting power of the last frame in the forward traffic channel of the base station BTS(x) with the best reverse reception quality during soft handoff, or filled in with the instantaneous transmitting power read by the last PCG of the last frame, but in Method 1, TX(x) is filled in with 0x00, or filled in with the average transmitting power TX(x) average in the forward traffic channel of the base station with the best reverse reception quality in the last N frames;

(4) for the operations in base stations, flexible slipping of [MIN_PWR, MAX_PWR] for forward traffic channel during soft handoff is implemented in Method 1, but the window is fixed within a certain range in Method 0, as shown in FIG. 4, the position of the fixed window most suitable to Method 0 can be found by using slipping window in Method 1; furthermore, it is more important that the implementation of the slipping window can greatly improve the adaptability of the synchronization algorithm to different radio network environments, and make all base stations involved in soft handoff transmit a considerably lower power during soft handoff with the requirements of communication quality fulfilled;

(5) for the operations in base stations for Method 1, the base station with strong reverse link performs FFLPC and base stations with weak reverse links turn off FFLPC and hold the forward link transmitting power at the median value of the upper and lower limits of the current slipping window, which reduces the unnecessary CPU cost greatly, but in Method 0, FFLPC is performed in base stations with both strong and weak links during the time interval in which no synchronization is required, the base stations with weak links will only set their transmitting power according to the forward transmitting power in the last frame of strong link indicated by the BSC when the decision of synchronization is made.

In the procedures of Method 0 and Method 1, it is required to set the evaluation criterion of the reception quality in reverse links, i.e. to decide which base station is the BTX(x) with the best reception quality in Step 202 of FIG. 2 and Step 302 of FIG. 3.

It is believed in the invention, the reverse power control sub-channel is a part of the reverse pilot channel in structure. So the frame energy of the reverse pilot channel ER-PICH, a parameter directly related to the reverse pilot channel, is the direct criterion for evaluating the forward link power control bit error rate in the reverse link power control sub-channel.

Therefore, the parameter ER-PICH is directly used as the criterion to evaluate the reception quality of forward power control bit for base stations involved in soft handoff: the higher the frame energy in the reverse pilot channel, the better the reception quality of the forward link power control bit in the base station involved in soft handoff. In practice, the BSC selects the maximum value among the frame energy of reverse pilot channels reported from the base stations, and marks the base station with the highest frame energy as the base station with strong link and the others as base stations with weak links.

In the invention, selecting the frame energy of reverse pilot channels as the parameter for evaluating forward power control bit error rate not only gives a directly relevant parameter, but also simplifies the complicated calculations of Eb/Nt with the reverse pilot frame energy and improves the working efficiency of the system compared to Patent EP1047207A2.

After the synchronization procedure of forward link transmitting power has been understood and the evaluation criteria for reverse reception quality during soft handoff have been defined, it is necessary to make clear further the definitions of status changes of soft handoff and the adjustment policy of power control parameters when handoff status changes, i.e. the operations in Step 207 in FIG. 2 and Step 309 in FIG. 3

Changes of said soft handoff status include the following:

a mobile station is brought into the soft handoff status from the non soft handoff status;

a mobile station is brought into the non soft handoff status from the soft handoff status;

the number of base stations involved in soft handoff increases; and the number of base stations involved in soft handoff decreases.

TABLE 1

Changes of soft handoff status and adjustment of power control parameters in forward traffic channels

| Soft handoff status (Number of legs) | 1 | 2 | 3 and above |
|---|---|---|---|
| [MIN_PWR, MAX_PWR] (dB), upper and lower limits of traffic channel | [−31.5, −11.5] | [−20, −12] | [−19, −13] |
| PWR_STEPSIZE_UP (dB), Ascending step length Of forward power control | 1 | 0.5 | 0.25 |
| PWR_STEPSIZE_DOWN (dB), Descending step length Of forward power control | 1 | 0.5 | 0.25 |
| PWR_CNTL_STEP (dB), Step length of reverse Power control | 1 | 1 | 1 |
| PC_GAIN (dB), power control bit gain | 2 | 5 | 6.75 |

By referring to FIG. 4 and Table 1, the power control parameters of forward traffic channels are adjusted as follows when soft handoff status changes.

When a mobile station in brought into the soft handoff status from the non soft handoff status or the number of base stations involved in soft handoff increases (e.g. from 2 to 3), the range between the upper and lower limits of transmitting power in forward traffic channel [FCH_MIN_PWR, FCH_MAX_PWR] is narrowed, which is done commonly by increasing the lower limit FCH_MIN_PWR or adjusting the upper and lower limits at the same time. The scale of adjusting the upper and lower limits or the magnitude of increasing the lower limit must be determined by the experimental data; in the meanwhile, since the power control step is permitted to be adjusted in IS2000 agreement, the adjustment step lengths PWR_STEPSIZE_UP and PWR_STEPSIZE_DOWN for forward power control can be decreased accordingly, for example, from commonly used 1 dB to 0.5 dB or 0.25 dB, or from 0.5 dB to 0.25 dB (refer to Table 1), which will benefit the reverse link stability; the above adjustment improves the forward link stability as well, since there is a very close relationship between the stability of reverse and forward links in FFLPC. With reverse power control incorporated at the same time, the BSC will send the handoff instruction message to the mobile station to decrease the reverse link power control step length PWR_CNTL_STEP, for example, from commonly used 1 dB to 0.5 dB or 0.25 dB, or from 0.5 dB to 0.25 dB (refer to Table 1), which aims at the improvement of the stability of reverse and forward links in FFLPC during soft handoff, too. In order to guarantee all base stations to receive the forward power control bit better, the power control bit gain PC_GAIN is increased from 2 dB to 5 dB or 6.75 dB, or from 5 dB to 6.75 dB (refer to Table 1) by informing the corresponding mobile station via the handoff instruction message. When the mobile station is brought into the non soft handoff status from the soft handoff status or the number of base stations involved in soft handoff decreases (e.g. from 3 to 2), the range of the upper and lower limits of transmitting power in forward traffic channel [FCH_MIN_PWR, FCH_MAX_PWR] is widened, which is done commonly by decreasing the lower limit FCH_MIN_PWR or adjusting the upper and lower limits at the same time, in general, the scale of widening the upper and lower limits or the magnitude of decreasing the lower limit are equal to the scale of narrowing the upper and lower limits or magnitude of increasing the lower limit in corresponding conditions; in the meanwhile, the adjustment step lengths PWR_STEPSIZE_UP and PWR_STEPSIZE_DOWN of forward power control are increased accordingly, for example, from 0.25 dB to 0.5 dB or 1 dB, or from 0.5 dB to 1 dB (refer to Table 1). With reverse link power control incorporated at the same time, the BSC will send the handoff instruction message to the mobile station to increase the reverse link power control step PWR_CNTL_STEP, for example, from 0.25 dB to 0.5 dB or 1 dB, or from 0.5 dB to 1 dB (refer to Table 1), which aims at the improvement of the stability of reverse and forward links in FFLPC during soft handoff. In the meanwhile, the mobile station is informed via the corresponding handoff instruction message to decrease the power control bit gain PC_GAIN, for example, from 6.75 dB to 5 dB or 2 dB, or from 5 dB to 2 dB.

FIGS. 5–10 are the simulation results at the synchronization speed of 50 Hz, 25 Hz, 10 Hz, 5 Hz, 2 Hz and 1 Hz, respectively, in the same soft handoff condition, wherein Curve 910 illustrates the variations of forward link transmission strength Ec/Io versus time for the base station with strong reverse link in the case of 2 base stations involved, Curve 920 illustrates the variations of forward link transmission strength Ec/Io versus time for the base station with weak reverse link and curve 930 illustrates the variations of the signal strength Eb/Nt received by the mobile station versus time.

It is shown from these simulation results that the higher the synchronization speed is, the closer the average values of transmitting power of strong and weak links are to each other and the better the object of FLPC is carried out. The synchronization speed should be taken as 10 Hz at least.)

In addition, the synchronization speed should be determined by considering the loads of processors. Because the data of base stations involved in soft handoff are transmitted via the reverse link traffic frame, processors will not suffer from additional loads. The only matter required to be dealt with is that the synchronization transmitting power of base stations should not interfere with the execution of FFLPC when the BSC sends synchronization data to base stations via the forward link traffic data frame.

It should be noted that the triggering factor of threshold of the difference of the transmitting power between strong and weak links in the simulations is ignored, that is to say, synchronization is performed in every synchronization period in these simulations.

In these simulations, synchronization delay of 1 frame is considered. But the simulation results with synchronization delay of 2 frames are similar while only a synchronization lag in the time axis is observed.

Figure 11:
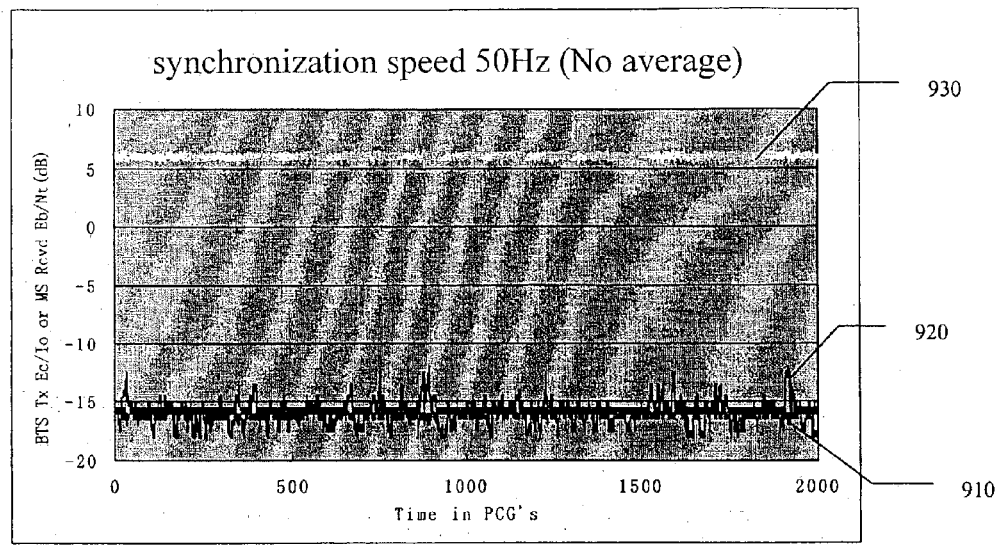
FIGS. 11–13 are the simulation results during soft handoff at the synchronization speeds of 50 Hz, 25 Hz and 10 Hz, respectively, with the transmitting power only in the last PCG of every frame synchronized and the transmitting power in all 16 PCG in the same frame not averaged.
Figure 12:
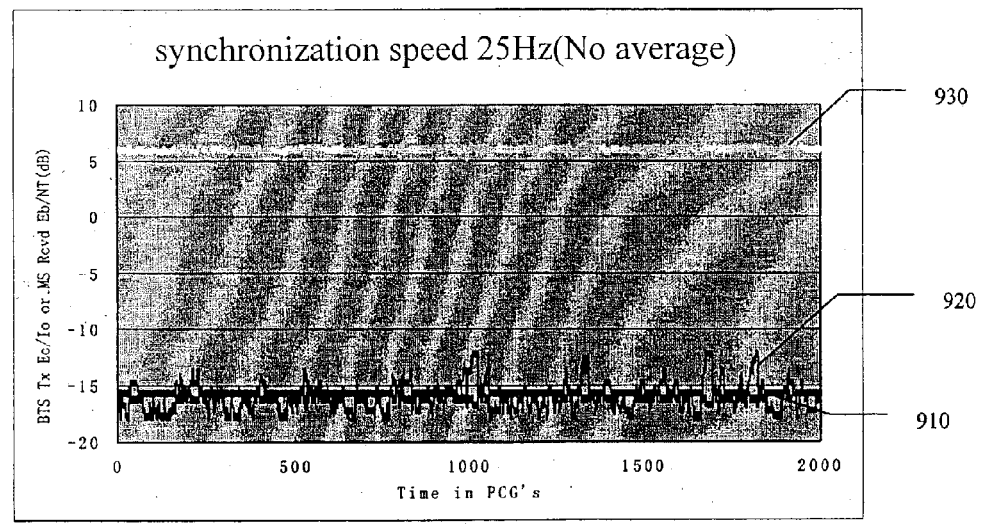
Figure 13:
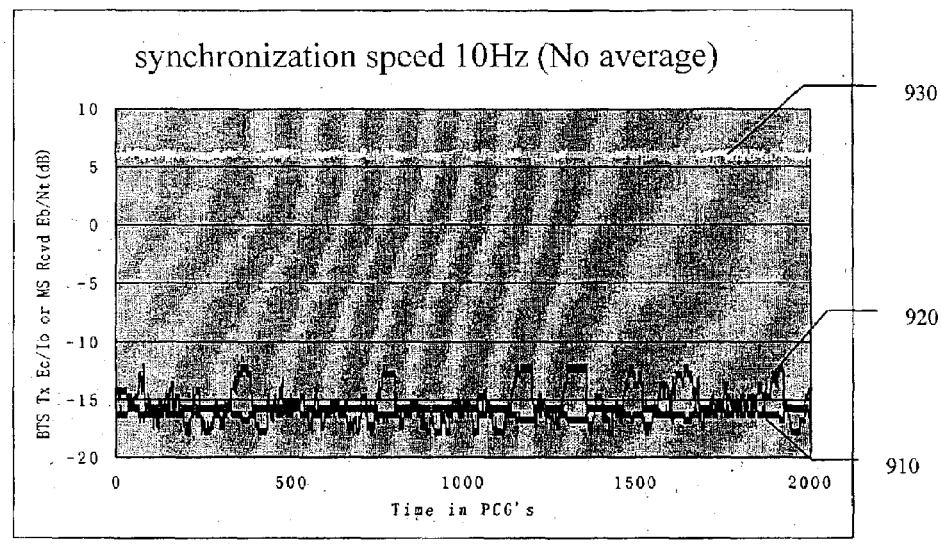

FIGS. 11–13 are the simulation results at the synchronization speeds of 50 Hz, 25 Hz and 10 Hz, respectively, wherein the simulations are carried out for only the transmitting power of the last PCG in a frame under the same soft handoff conditions with the transmitting power of the all 16 PCG not averaged. The labels in these figures are the same as in FIG. 5–FIG. 10.

The simulations are made based on the assumption that only the transmitting power of the last PCG of every frame is considered when performing the synchronization instead of averaging the transmitting power of the 16 PCG of each frame. The. instantaneous transmitting power represents the current transmitting power of the traffic channel better if the synchronization delay is ignored.

It can be found from these simulation results that, if the non-averaged transmitting power of the strong link read from the last PCG in every frame is set as the target of synchronization, the transmitting power of the weak link will have sudden changes greater than that in synchronization method with average power, which demonstrates the unsteady magnitude of transmitting power in the weak link and seems disadvantageous to the synchronization object in FLPC during soft handoff.

Furthermore, it is better to use the average transmitting power of the last 16 PCG of the strong link as the synchronization target if synchronization delay is considered.

Figure 14:
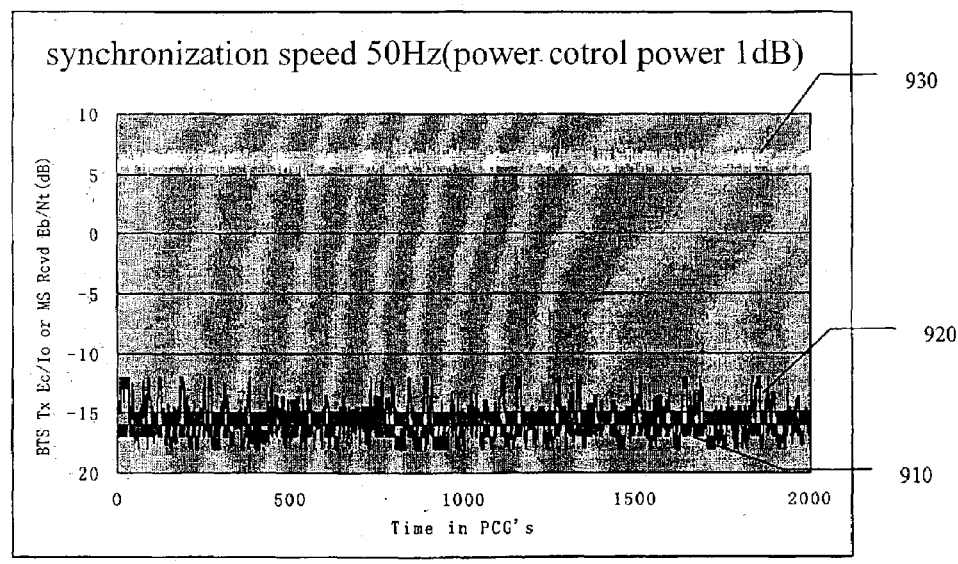
FIGS. 14–15 are the simulation results for the power control step of 1 dB and at the synchronization speeds of 50 Hz and 10 Hz, respectively, with a sudden change in the transmitting power of weak link greater than that for the power control step of 0.5 dB.
Figure 15:
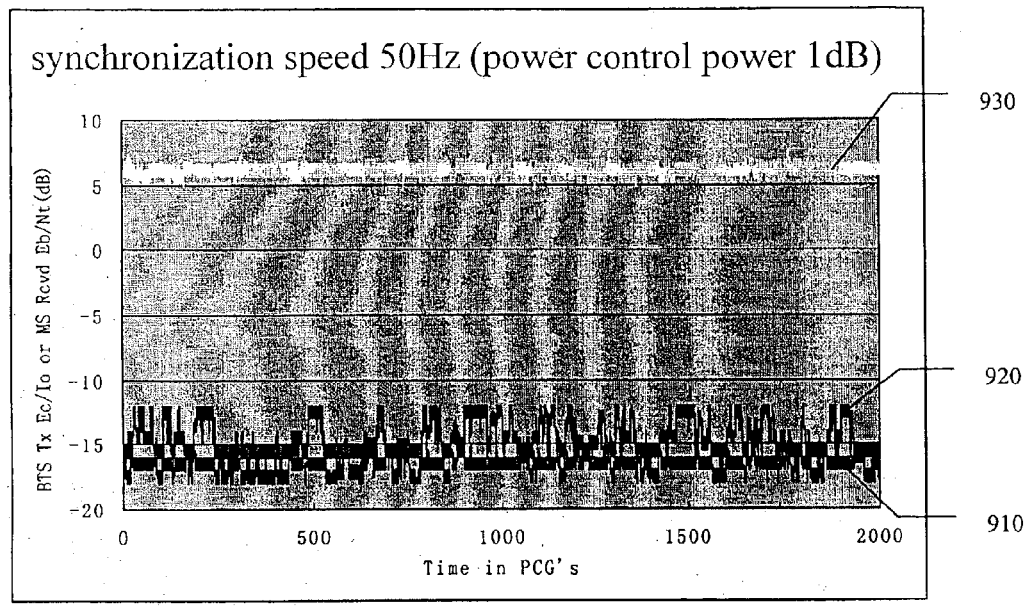

FIGS. 14–15 are the simulation results of transmitting power at the synchronization speeds of 50 Hz and 10 Hz, respectively, with the power control step of 1 dB and with sudden changes in transmitting power of the weak link greater than those with power control step of 0.5 dB. The difference between these simulations in FIG. 14–15 and the previous ones are the power control step, which is 1 dB in the simulations in FIG. 14–15. From these simulation results, it can be found that, larger range and larger magnitude of changes occur in these simulations than in the ones with 0.5 dB, which is disadvantageous to the synchronization in FLPC during soft handoff.

Figure 16:
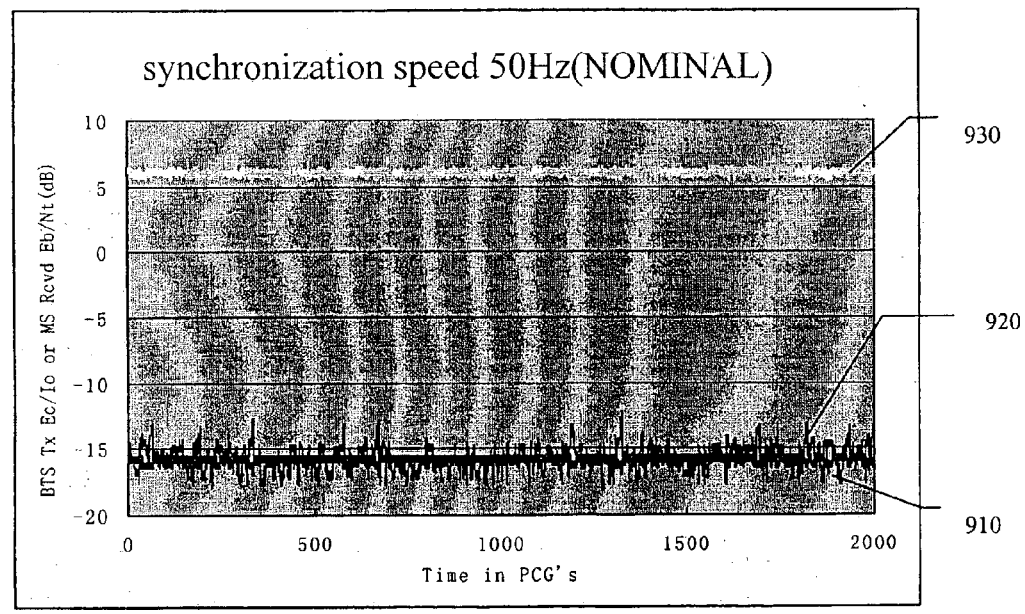
FIG. 16 and FIG. 17 are the simulation results at the synchronization speeds of 50 Hz and 10 Hz, respectively, with the transmitting power adjusted to be equal to its nominal value, i.e. ($\frac{1}{2}$*(MAX_PWR+MIN_PWR)), when the transmitting power reaches its maximum or minimum.
Figure 17:
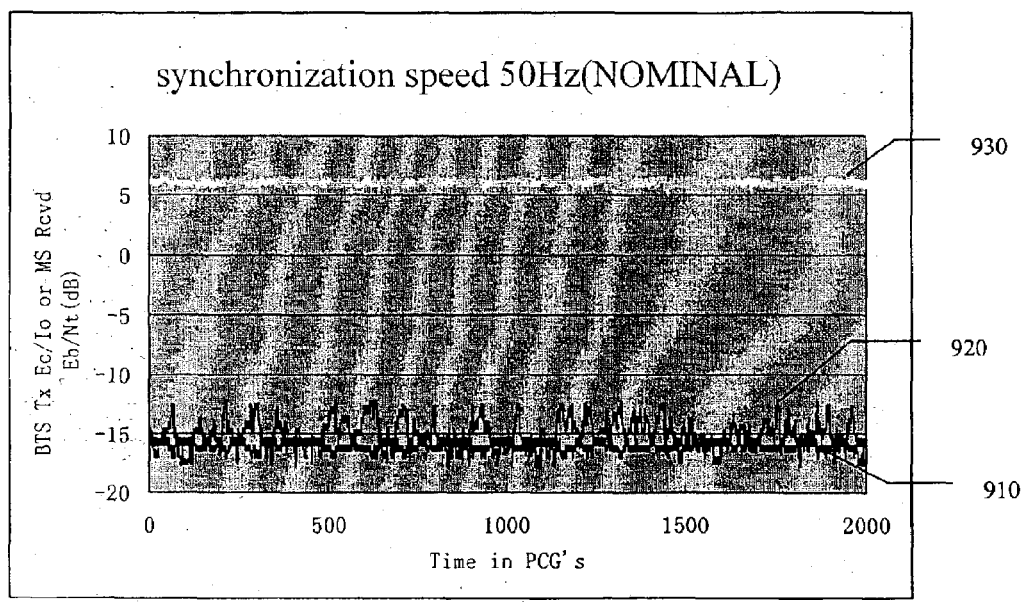

FIGS. 16–17 are the simulation results at the synchronization speeds of 50 Hz and 10 Hz, respectively, with transmitting power tuned to the nominal value, i.e. ½* (MAX_PWR+MIN_PWR), and with its maximum or minimum reached. The difference between these simulations in FIG. 16–17 and the previous one are that, when the transmitting power reaches the maximum or minimum, it is adjusted to nominal value directly. From these simulation results, it can be found that, larger sudden changes occur in transmitting power of the weak link, which seems not advantageous to the synchronization.

It is concluded from above discussions that the invention has provided qualitatively and quantitatively the creative methods for synchronization control of forward link transmitting power during soft handoff under FFLPC condition in CDMA2000 systems, proposed the most direct and relevant criteria for evaluating the reception quality of reverse links (i.e. determining whether a link is strong or weak), and set up the procedures of adjusting power control parameters as soft handoff status changes. The technical scheme of the invention is not only used in CDMA systems, but also is widely applicable to evaluation of strong or weak links, adjustment of power control parameters and synchronization mechanism in all wireless communication systems related to handoff. All other schemes similar to the schemes of the invention in synchronization method, procedures for evaluating links and power control parameter adjustment are covered within the scope of the invention.

The invention claimed is:

1. A method for synchronization control of forward link transmitting power during soft handoff in mobile communication systems, wherein the mobile communication system includes base stations (BS) involved in soft handoff, mobile stations (MS) and a base station controller (BSC), and said method comprising the steps of:
    a) determining the current transmitting power TX(i) in the forward link of the base station involved in soft handoff and obtaining the reverse link signal;
    b) determining the reception quality of reverse links directly from the obtained reverse link signal;
    c) determining the best base station BTS(x) based on the reception quality of reverse links;
    d) deciding whether adjustment of forward link transmitting power is required according to the current transmitting power TX(x) in the forward link corresponding to the best base station BTS(x), and
    e) deciding whether adjustment of power control parameters is required according to the number of the base stations involved in soft handoff and whether the system time of the base stations arrives at the end of a N frame period.

2. The method according to claim 1, wherein step b) includes the steps of: obtaining from the reverse link signals the frame energy ER-PICH, which represents directly the reception quality of reverse links; and evaluating the reception quality of reverse links directly from the frame energy.

3. The method according to claim 2, wherein the step of obtaining the frame energy ER-PICH, which represents directly the reception quality of reverse links, includes extracting field FRAME_ENERGY from the reverse traffic frame message in reverse link signals.

4. The method according to claim 1, further comprising the steps of: recording and storing TX(x) or the frame energy or field FRAME_ENERGY reported by BTS(x), marking the base station as the base station with strong reverse link, and determining the marking the others as base stations with weak reverse links.

5. The method according to claim 4, further comprising the step of sending to all base stations currently involved in soft handoff the reverse link flags, TX(x) or the frame energy of the strong link or field FRAME_ENERGY of the strong link, and the number of base stations currently involved in soft handoff.

6. The method according to claim 5, wherein the BSC sends the information to all base stations involved in soft handoff via the forward link traffic data frame.

7. The method according to claim 5, further comprising the step of determining whether a base station is the base station with strong or weak link according to the flag in the forward link traffic data frame from the BSC.

8. The method according to claim 1, further comprising the steps of: calculating the deviations between the current transmitting power TX(i) or frame energy or field FRAME_ENERGY of all base stations and the transmitting power TX(i) or frame energy or field FRAME_ENERGY of the specified base station with strong link, respectively, and the synchronization operation is performed in the base stations involved in soft handoff when the absolute value of the deviations are greater than the first threshold, the synchronization operation is not performed in the base stations involved in soft handoff when the absolute value of the deviations are not greater and the first threshold.

9. The method according to claim 8, wherein said power synchronization operation includes adjusting the transmitting power TX(i) of forward links to be equal to the current transmitting power TX(x) of the forward link corresponding to the best base station BTS(x).

10. The method according to claim 1, further comprising the step of determining the power control parameters according to the number of base stations involved in soft handoff.

11. The method according to claim 10, wherein said determination of power control parameters includes determining the first threshold.

12. The method according to claim 11, wherein said first threshold is equal to TX(x)/n, or equal to the frame energy of the determined strong link divided by n or the value of field FRAME_ENERGY of the strong link divided by n, wherein TX(x) is the transmitting power of strong link and n is the number of base stations involved in soft handoff.

13. The method according to claim 1, wherein said step d) includes determining the best base station BTS(x) according to the reverse link FER.

14. The method according to claim 1, wherein said step d) includes determining the best base station BTS(x) according to the FFLPC bit error rate, wherein
the link is marked as a weak link if the higher the reverse link FER is, the higher the FFLPC bit error rate is; the link is marked as the strong link if the lower the reverse link FER is, the lower the FFLPC bit error rate is.

15. The method according to claim 1, wherein said step d) includes determining the best base station BTS(x) according to the reverse link Eb/Nt.

16. The method according to claim 15, wherein the adjustment of power control parameters includes adjustment of at least one of the following parameters:
(a) the range between the upper and lower limits of the transmitting power in the forward link traffic channel [MIN_PWR, MAX_PWR];
(b) the adjustment step length of forward link power control;
(c) the ascending step length of forward link power control PWR_STEPSIZE_UP;
(d) the descending step length of forward link power control PWR_STEPSIZE_DOWN is decreased accordingly, with reverse link power control incorporated, the BSC sends a message to mobile stations via the handoff instruction message to (increase/decrease) the reverse power control step PWR_CNTL_STEP;
(e) the power control bit gain PC_GAIN.

17. The method according to claim 16, wherein, when the mobile station is brought into the soft handoff status from the non soft handoff status or the number of base stations involved in soft handoff increases, said range between the upper and lower limits of the current transmitting power in the forward traffic channel [MIN_PWR, MAX_PWR] will be narrowed, the power adjustment step length of forward transmitting power, the ascending step length of forward transmitting power PWR_STEPSIZE_UP and the descending step length of forward transmitting power PWR_STEPSIZE_DOWN are decreased accordingly; with reverse power control incorporated, the BSC sends the handoff instruction message to the mobile station to decrease the power control step PWR_CNTL_STEP in the reverse link and increase the power control bit gain PC_GAIN accordingly;

when the mobile station is brought into the non soft handoff status from the soft handoff status or the number of base stations involved in soft handoff decreases, the range of the transmitting power in the forward traffic channel [MIN_PWR, MAX_PWR] is widened, the ascending step length of forward transmitting power PWR_STEPSIZE_UP and the descending step length of forward transmitting power PWR_STEPSIZE_DOWN are increased accordingly; with reverse link power control incorporated, the BSC sends the handoff instruction message to the mobile station to increase the power control step PWR_CNTL_ STEP in the reverse link and decrease the power control bit gain PC_GAIN accordingly.

18. The method according to claim 1, wherein said base stations involved in soft handoff collect the current transmitting power TX(i) of forward links in every frame.

19. The method according to claim 1, wherein said step d) is accomplished by the SVM of the BSC.

20. The method according to claim 1, further comprising the step of calculating the average value TX average=ΣTX (i)/N (i=0, 1, . . . N−1) of the previous N frames at the end of the Nth frame; setting TX(N) to be equal to TX average and the other TX(i) to be equal to 0x00, i.e. TX(i)=0x00 for i≠N.

21. The method according to claim 20, further comprising the step of: sending the reverse link flags, TX(x) average or 0x00, and the number of base stations involved in soft handoff to all base stations; deciding slipping window will not be made when TX(x)=0x00, i.e. the base station with strong reverse link will continue to carry out FFLPC and the base stations with weak reverse links will maintain their transmitting power to be equal to the second predetermined value of the current window of forward transmitting power of the base station with strong reverse link, and the deciding slipping window will be made when TX(x)≠0x00.

22. The method according to claim 21, wherein said second predetermined value is the median value of the upper and lower limits [MIN_PWR, MAX_PWR], i.e. (MIN_PWR+MAX_PWR)/2.

23. The method according to claim 20, further comprising the step of determining whether the absolute deviations between the current TX(x) average of the base station with strong link and the upper or lower limit of the current window are greater than the third threshold, the window is not slipped if the deviations are not greater than the threshold and the window is slipped otherwise; wherein the window is moved up if TX(x) average is close to the upper limit and the window is moved down if TX(x) average is close to the lower limit.

24. The method according to claim 19, wherein said slipping window operation is performed by all base stations at the same time if the window is required to be moved.

25. The method according to claim 17, wherein said range between the upper and lower limits of the transmitting power in forward traffic channel [MIN_PWR, MAX_PWR] is narrowed by increasing the lower limit MIN_PWR or decreasing the upper limit MAX_PWR, or increasing MIN_PWR and decreasing MAX_PWR at the same time.

26. The method according to claim 23, wherein the scale of widening of the range or magnitude of decrease of the lower limit are the same as the scale of narrowing of the range or the magnitude of increase of the lower limit increasing in the corresponding conditions.

27. The method according to claim 17, wherein said range between the upper and lower limits of the transmitting power in the forward traffic channel [MIN_PWR, MAX_PWR] is widened by decreasing the lower limit MIN_PWR or increasing the upper limit MAX_PWR, or decreasing MIN_PWR and increasing MAX_PWR at the same time.

28. A computer program, comprising all the programmed instructions for a computer to implement the method according to claim 1.

29. The computer program according to claim 28, stored in computer storage.

30. The computer program according to claim 28, carried by electrical signals or optical signals or magnetic signals, or located on computer networks.

31. A recording media, wherein a computer program is recorded thereon for controlling the computer to implement the method according to claim 1.

32. An apparatus for synchronization control of forward link transmitting power during soft handoff in mobile communication systems, wherein said communication system includes base stations involved in soft handoff, mobile stations and a BSC, and the apparatus comprising:

a reception means, for determining the current transmitting power TX(i) in the forward links for the base stations involved in soft handoff and obtaining reverse link signals;

determining means, for determining directly the reception quality of reverse links according to the reverse link signals obtained, and determining the best base station BTS(x) according to the reception quality of reverse links;

a processing means, for determining whether:

a) the transmitting power in the forward links should be adjusted according to the current transmitting power TX(x) in the forward link corresponding to the best base station BTS(x), b) adjustment of power control parameters is required according to the number of the base stations involved in soft handoff, and c) the system time of the base stations arrives at the end of a N frame period.

33. The apparatus according to claim 32, wherein said determining means comprises a signal extracting means for extracting the frame energy ER-PICH, which represents directly the reverse link quality, from the obtained reverse link signals for being processed by the processing means.

34. The apparatus according to claim 33, wherein said signal extracting means is used to extract the field value of FRAME_ENERGY from the traffic frame information in the reverse link signals.

35. An apparatus for synchronization control of forward link transmitting power during soft handoff in mobile communication systems, comprising a processing means, which is all-purpose or special CPU; memory and input/output interfaces for exchanging information between the processing means and memory and mobile stations, wherein said apparatus for synchronization control of forward link transmitting power implement the method according to claim 1.

* * * * *

US007194281C1

(12) EX PARTE REEXAMINATION CERTIFICATE (10666th)
United States Patent
Peng et al.

(10) Number: US 7,194,281 C1
(45) Certificate Issued: Jul. 20, 2015

(54) METHOD AND APPARATUS FOR SYNCHRONIZATION CONTROL OF FORWARD LINK TRANSMITTING POWER DURING SOFT HANDOFF IN WIRELESS COMMUNICATION SYSTEMS

(75) Inventors: Weizhong Peng, Nanshan District (CN); Yue Wang, Nanshan District (CN); Ping Li, Nanshan District (CN); Jia Qiao, Nanshan District (CN)

(73) Assignee: ZTE Corporation, South Hi-Tech Industrial Park, Nanshan District, Shenzhen (CN)

Reexamination Request:
No. 90/013,267, Jun. 24, 2014

Reexamination Certificate for:
Patent No.: 7,194,281
Issued: Mar. 20, 2007
Appl. No.: 10/286,972
Filed: Nov. 4, 2002

(51) Int. Cl.
*H04B 7/00* (2006.01)
*H04B 7/185* (2006.01)
*H04W 52/24* (2009.01)
*H04W 36/18* (2009.01)

(52) U.S. Cl.
CPC .............. *H04W 52/24* (2013.01); *H04W 36/18* (2013.01)

(58) Field of Classification Search
None
See application file for complete search history.

(56) References Cited

To view the complete listing of prior art documents cited during the proceeding for Reexamination Control Number 90/013,267, please refer to the USPTO's public Patent Application Information Retrieval (PAIR) system under the Display References tab.

*Primary Examiner* — Roland Foster

(57) ABSTRACT

The present invention relates to a method and an apparatus for synchronization control of forward link transmitting power during soft handoff, comprising: collecting the current transmitting power TX(i) of the forward links and the current reception quality of the reverse links; selecting the best base station BTS(x), recording and storing TX(x) reported by BTS (x), marking the BTS(x) as the base station with strong reverse link and the others as base stations with weak reverse link; sending the reverse link flags, TX(x) and the number of base stations involved in soft handoff to all base stations; determining whether a base station is the base station with weak link according to the flag from the base station controller; calculating the deviation between the current transmitting power TX(i) and the TX(x) if the base station is with weak link; adjusting the power control parameters and repeating the above steps; the parameters of the reception quality in reverse links are sampled for every frame in the invention, which not only improves the real time performance of synchronization, but also achieves power synchronization of all base stations and improves the system operation efficiency.

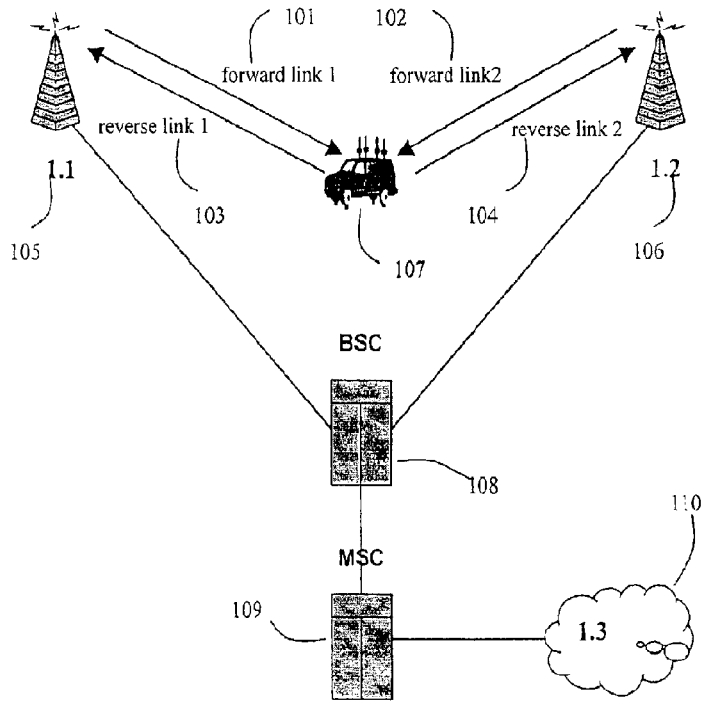

US 7,194,281 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7 and 8 are cancelled.

Claims 1 and 32 are determined to be patentable as amended.

Claims 2-6, 9-31 and 33-35, dependent on an amended claim, are determined to be patentable.

1. A method for synchronization control of forward link transmitting power during soft handoff in mobile communication systems, wherein the mobile communication system includes base stations (BS) involved in soft handoff, mobile stations (MS) and a base station controller (BSC), and said method comprising the steps of:
   a) determining the current transmitting power TX(i) in the forward link of each base station involved in soft handoff and obtaining the reverse link signal;
   b) determining the reception quality of reverse links directly from the obtained reverse link signal;
   c) determining, at the BSC, the best base station BTS(x) based on the reception quality of reverse links and sending flags to the base stations;
   d) each of the base stations determining whether the base station is the base station with strong or weak link according to the flag in the forward link traffic data frame from the BSC and deciding, based on the determining whether the base station is the base station with the strong or weak link, whether adjustment of forward link transmitting power is required according to the current transmitting power TX(x) in the forward link corresponding to the best base station BTS(x), [and]
   e) deciding whether adjustment of power control parameters is required according to the number of the base stations involved in soft handoff and whether the system time of the base stations arrives at the end of a N frame period;
   *f) calculating, at each of the base stations, the deviation between the current transmitting power TX(i) or frame energy or field FRAME_ENERGY of the base station and the transmitting power TX(x) or frame energy or field FRAME_ENERGY of the best base station with the strong link; and*
   *g) performing a synchronization operation of the forward link transmitting power, at each base station involved in the soft handoff, when an absolute value of the respective deviation, calculated at the base station, is greater than a first threshold, the synchronization operation is not performed in the base station involved in the soft handoff when the absolute value of the respective deviation is not greater and the first threshold.*

32. An apparatus for synchronization control of forward link transmitting power during soft handoff in mobile communication systems, wherein said communication system includes base stations involved in soft handoff, mobile stations and a BSC, and the apparatus comprising:
    a reception means, for determining the current transmitting power TX(i) in the forward links for the base stations involved in soft handoff and obtaining reverse link signals;
    determining means, for determining directly the reception quality of reverse links according to the reverse link signals obtained based on a comparison of fast forward link power control (FFLPC) bit error rate to one of frame energy ER-PICH, reverse link frame error rate FER, or reverse link signal to noise ratio Eb/Nt, and determining the best base station BTS(x) according to the reception quality of reverse links;
    a processing means, for determining whether: a) the transmitting power in the forward links should be adjusted according to the current transmitting power TX(x) in the forward link corresponding to the best base station BTS(x), b) adjustment of power control parameters is required according to the number of the base stations involved in soft handoff, and c) the system time of the base stations arrives at the end of a N frame period, *wherein the processing means within each base station determines whether the transmitting power TX(i) in the forward link of the base station should be adjusted based on calculating, at the base station, the deviation between the current transmitting power TX(i) or frame energy or field FRAME_ENERGY of the base station and the transmitting power TX(x) or frame energy or field FRAME_ENERGY of the best base station with the strong link.*

\* \* \* \* \*